United States Patent
Rai Kurlethimar et al.

(10) Patent No.: US 12,488,769 B2
(45) Date of Patent: Dec. 2, 2025

(54) CONTENT BASED FOVEATION

(71) Applicant: Apple Inc., Cupertino, CA (US)

(72) Inventors: Yashas Rai Kurlethimar, San Jose, CA (US); Nathaniel C. Begeman, Saratoga, CA (US); Seyedkoosha Mirhosseini, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/616,064

(22) Filed: Mar. 25, 2024

(65) Prior Publication Data
US 2024/0331661 A1    Oct. 3, 2024

Related U.S. Application Data (60) Provisional application No. 63/455,599, filed on Mar. 30, 2023.

(51) Int. Cl.
| | |
|---|---|
| *G02B 27/00* | (2006.01) |
| *G02B 27/01* | (2006.01) |
| *G06F 3/01* | (2006.01) |
| *G06T 9/00* | (2006.01) |
| *G06T 17/00* | (2006.01) |

(Continued)

(52) U.S. Cl.
CPC ......... *G09G 5/391* (2013.01); *G02B 27/0093* (2013.01); *G02B 27/0172* (2013.01); *G06F 3/012* (2013.01); *G06T 9/007* (2013.01); *G06T 17/005* (2013.01); *H04N 19/625* (2014.11); *H04N 19/96* (2014.11); *G06T 2207/20052* (2013.01); *G09G 2340/0407* (2013.01)

(58) Field of Classification Search
CPC ........... G09G 5/391; G09G 2340/0407; G02B 27/0093; G02B 27/0172; G06F 3/012; G06F 3/011; G06T 9/007; G06T 17/005; G06T 2207/20052; G06T 3/40; H04N 19/625; H04N 19/96; H04N 19/132; H04N 19/167

See application file for complete search history.

(56) References Cited

U.S. PATENT DOCUMENTS

| | | | |
|---|---|---|---|
| 6,690,728 B1 * | 2/2004 | Chang | H04N 19/105 |
| | | | 375/E7.114 |
| 9,665,171 B1 * | 5/2017 | Skogö | G06F 3/013 |

(Continued)

FOREIGN PATENT DOCUMENTS

KR    20190103102 A    9/2019

OTHER PUBLICATIONS

Tursun, Okan Tarhan, et al. "Luminance-contrast-aware foveated rendering." ACM Transactions on Graphics (TOG) 38.4 (2019): 1-14.

(Continued)

*Primary Examiner* — Mihir K Rayan
(74) *Attorney, Agent, or Firm* — Fernando & Partners, LLP (57) ABSTRACT

Prior to rendering a current frame, a device obtains a previously rendered frame. The device determines that a first portion of the previously rendered frame is associated with a particular type of content. The device renders a first portion of the current frame that corresponds to the first portion of the previously rendered frame with a first rendering characteristic while rendering a second portion of the current frame with a second rendering characteristic that is different from the first rendering characteristic.

20 Claims, 6 Drawing Sheets

(51) Int. Cl.
*G09G 5/391* (2006.01)
*H04N 19/625* (2014.01)
*H04N 19/96* (2014.01)

(56) References Cited

U.S. PATENT DOCUMENTS

| | | | |
|---|---|---|---|
| 10,169,843 B1* | 1/2019 | Amer | G06T 7/223 |
| 2003/0063223 A1* | 4/2003 | Ojo | H04N 19/503 |
| | | | 348/700 |
| 2005/0122433 A1* | 6/2005 | Satou | H04N 5/21 |
| | | | 348/E5.077 |
| 2015/0029218 A1* | 1/2015 | Williams | G02B 27/0172 |
| | | | 345/633 |
| 2015/0339994 A1* | 11/2015 | Verbeure | G09G 3/2003 |
| | | | 345/214 |
| 2016/0050440 A1* | 2/2016 | Liu | H04N 19/96 |
| | | | 348/43 |
| 2016/0267716 A1* | 9/2016 | Patel | G06F 3/013 |
| 2016/0364904 A1* | 12/2016 | Parker | G06F 3/038 |
| 2017/0213388 A1* | 7/2017 | Margolis | G06T 13/00 |
| 2017/0263046 A1* | 9/2017 | Patney | G06T 15/20 |
| 2018/0192058 A1* | 7/2018 | Chen | G06T 3/403 |
| 2020/0169734 A1* | 5/2020 | Fainstain | G06T 7/246 |
| 2021/0097756 A1* | 4/2021 | Surti | G06T 15/005 |
| 2021/0142520 A1 | 5/2021 | Krishnan et al. | |

OTHER PUBLICATIONS

International Search Report and Written Opinion for corresponding International Appl. No. PCT/US2024/021481 mailed Jun. 27, 2024 (14 pages).

* cited by examiner

CONTENT BASED FOVEATION

CROSS-REFERENCE TO RELATED APPLICATIONS

This application claims the benefit of U.S. Provisional Patent App. No. 63/455,599, filed on Mar. 30, 2023, which is incorporated by reference in its entirety.

TECHNICAL FIELD

The present disclosure generally relates to content based foveation.

BACKGROUND

Some devices include a display that displays visual content. Presenting the visual content may include utilizing a renderer to render the visual content. Displaying the visual content at a relatively high resolution tends to enhance a user experience provided by the device. However, rendering the visual content at a relatively high resolution can be resource-intensive thereby draining a battery of the device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for foveating a frame based on content. In some implementations, a method is performed by a device including a display, a non-transitory memory and one or more processors coupled with the display and the non-transitory memory. In various implementations, a method includes, prior to rendering a current frame, obtaining a previously rendered frame. In some implementations, the method includes determining that a first portion of the previously rendered frame is associated with a particular type of content. In some implementations, the method includes rendering a first portion of the current frame that corresponds to the first portion of the previously rendered frame with a first rendering characteristic while rendering a second portion of the current frame with a second rendering characteristic that is different from the first rendering characteristic.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A device that displays visual content may include a renderer that renders frames that can be displayed on a display of the device. The renderer may be capable of rendering frames with various rendering characteristics. For example, the renderer may be capable of rendering frames at relatively high resolutions and at relatively low resolutions. Rendering frames at a relatively high resolution can be resource-intensive. Moreover, since certain type of content can be rendered at a relatively low resolution without adversely impacting viewability, rendering such type of content at a high resolution tends to unnecessarily utilize computing resources.

The present disclosure provides methods, systems, and/or devices for performing content based foveation. Performing content based foveation allows a device to render different portions of a current frame with different rendering characteristics. Utilizing rendering characteristics that require fewer resources to generate at least some portions of the current frame tends to conserve resources. In operation, the device utilizes a previously rendered frame to determine that a first portion of a current frame is to be rendered with a first rendering characteristic and a second portion of the current frame can be rendered with a second rendering characteristic that is less resource-intensive than the first rendering characteristic. For example, the device utilizes the previously rendering frame to estimate that the first portion of the current frame is to be rendered at a relatively high resolution and the second portion of the current frame can be rendered at a relatively low resolution. In this example, the device conserves resources by not rendering the second portion at the relatively high resolution.

Prior to rendering a current frame, the device determines which portions of the current frame are likely to be associated with low frequency content and which portions of the current frame are likely to be associated with high frequency content. High frequency content is to be rendered at a relatively high resolution in order to provide an acceptable level of viewability while low frequency content can be rendered at a relatively low resolution in order to conserve rendering resources. Rendering the low frequency content at the relatively low resolution tends to conserve computing resources and prolong a battery life of the device.

Since the device cannot perform content analysis on the current frame prior to rendering the current frame, the device can utilize a previously rendered frame to estimate which portions of the current frame are likely to represent high frequency content and which portions of the current frame are likely to represent low frequency content. The previously rendered frame may be a low resolution render of the current frame. Alternatively, the previously rendered frame may correspond to a previous time. The device can reproject the previously rendered frame based on head pose data in order to reduce a difference between the previously rendered frame and the current frame to be rendered.

The device may identify low frequency and high frequency portions of the previously rendered frame based on respective compression efficiencies of various portions of the previously rendered frame. The low frequency portions of the previously rendered frame may have a greater compression efficiency because the low frequency portions can be compressed to a greater degree due to fewer variance in texture values. The high frequency portions of the previously rendered frame tend to have a lower compression efficiency because the high frequency portions are compressed to a lesser degree due to greater variance in texture values.

The device may utilize separate renderers to render low frequency portions and high frequency portions of the current frame. For example, the device may utilize a low frequency renderer to render low frequency portions of the current frame and a high frequency renderer to render high frequency portions of the current frame. Additionally or alternatively, the device may utilize shaders of varying complexity to render low frequency and high frequency portions of the current frame. For example, the device may use shaders of relatively low complexity to render low frequency portions of the current frame and shaders of relatively high complexity to render high frequency portions of the current frame.

Figure 1A:
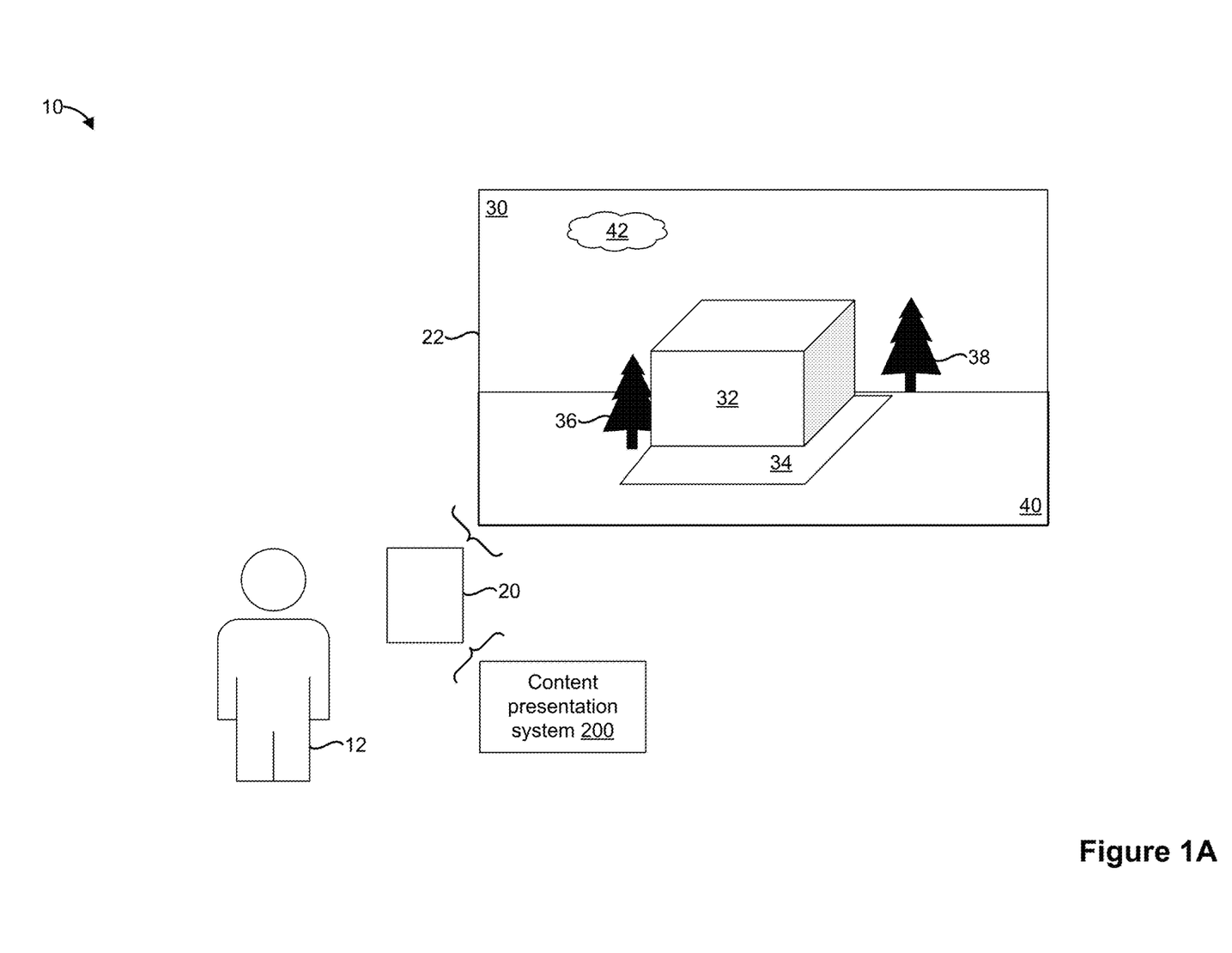
FIGS. 1A-1C are diagrams of an example operating environment in accordance with some implementations.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user 12 of the electronic device 20. In some implementations, the electronic device 20 includes a handheld computing device that can be held by the user 12. For example, the electronic device 20 may include a smartphone, a tablet, a media player, a laptop or the like that can be held by the user 12. Alternatively, in some implementations, the electronic device 20 includes a wearable computing device that can be worn by the user 12. For example, the electronic device 20 may include a head-mountable device (HMD) or an electronic watch that can be worn by the user 12.

In various implementations, the electronic device 20 includes a display 22 and a content presentation system 200. The content presentation system 200 generates visual content and the display 22 displays the visual content. In the example of FIG. 1A, the display 22 is displaying a previously rendered frame 30 that the content presentation system 200 rendered. The previously rendered frame 30 depicts a building 32, a patio 34, a first tree 36, a second tree 38, grass 40 around the building 32 and a cloud 42.

Figure 1B:
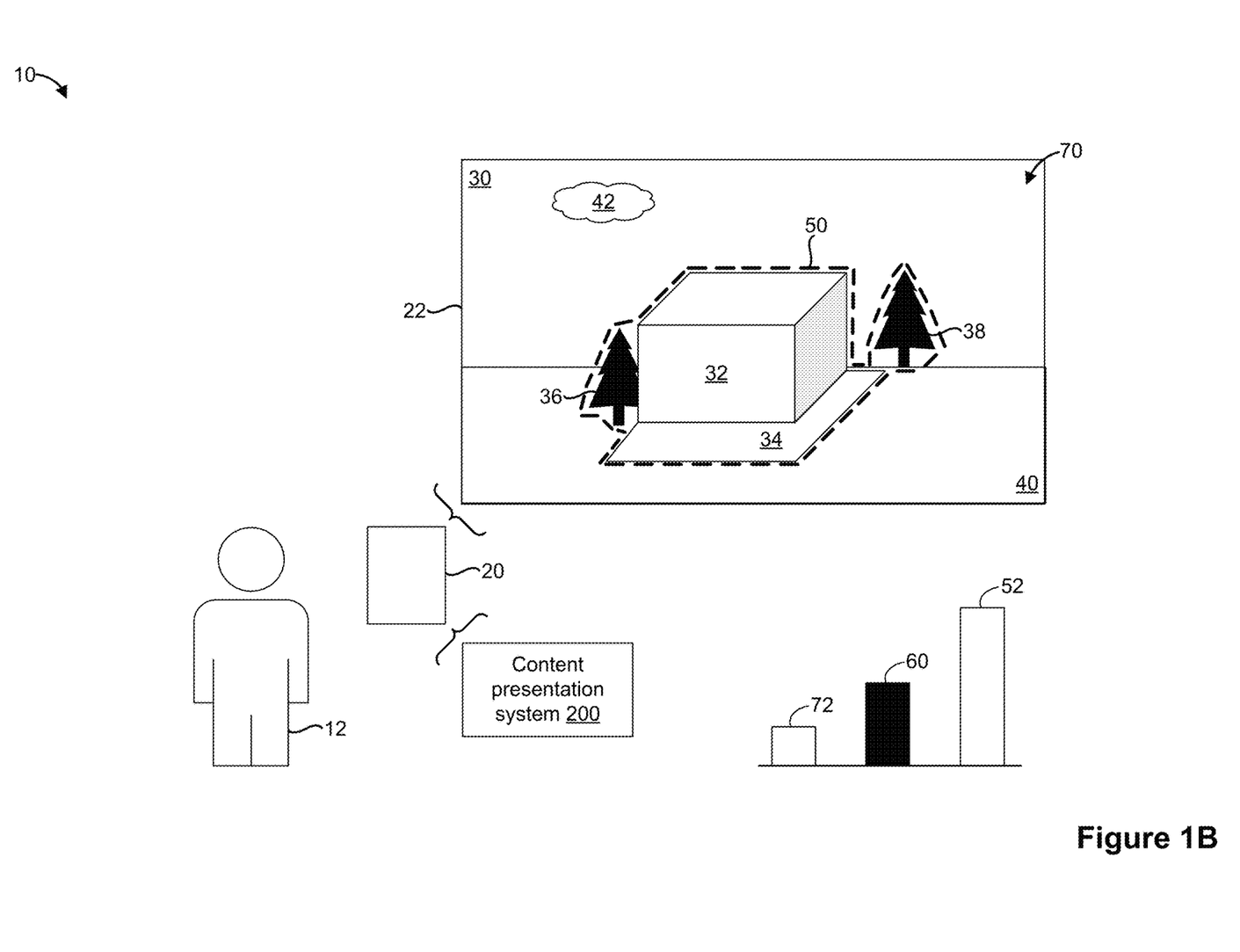

In various implementations, the content presentation system 200 renders a current frame based on a type of content represented by the previously rendered frame 30. Referring to FIG. 1B, in various implementations, the content presentation system 200 identifies types of content represented by respective portions of the previously rendered frame 30. In the example, of FIG. 1B, the content presentation system 200 determines that a first portion 50 of the previously rendered frame 30 represents a particular type of content. The content presentation system 200 may determine that a second portion 70 of the previously rendered frame 30 (e.g., a remainder of the previously rendered frame 30) does not represent the particular type of content.

In some implementations, the content presentation system 200 performs frequency analysis on the previously rendered frame 30 in order to identify the particular type of content that the first portion 50 of the previously rendered frame 30 represents. In some implementations, the content presentation system 200 generates a discrete cosine transform (DCT) for the previously rendered frame 30. The DCT for the previously rendered frame 30 may indicate that the first portion 50 of the previously rendered frame 30 is associated with a first frequency 52 that is greater than a threshold frequency 60. For example, the DCT of the previously rendered frame 30 may indicate that the first portion 50 of the previously rendered frame 30 represents high frequency content. The DCT for the previously rendered frame 30 may indicate that the second portion 70 of the previously rendered frame 30 (e.g., the remainder of the previously rendered frame 30) is associated with a second frequency 72 that is less than the threshold frequency 60. For example, the DCT of the previously rendered frame 30 may indicate that the second portion 70 of the previously rendered frame 30 represents low frequency content.

In some implementations, the content presentation system 200 performs a reprojection operation on the previously rendered frame 30 prior to determining which portions of the previously rendered frame 30 include high frequency content. The content presentation system 200 reprojects the previously rendered frame 30 based on head pose data that indicates a movement of a head of the user 12 so that the previously rendered frame 30 more closely represents the current frame that the content presentation system 200 has to render. Reprojecting the previously rendered frame 30 based on the head pose data results in the previously rendered frame 30 being updated to reflect movement in the head of the user 12 since the previously rendered frame 30 was rendered. Reprojecting the previously rendered frame 30 may include warping the previously rendered frame 30 based on the head pose data.

Figure 1C:
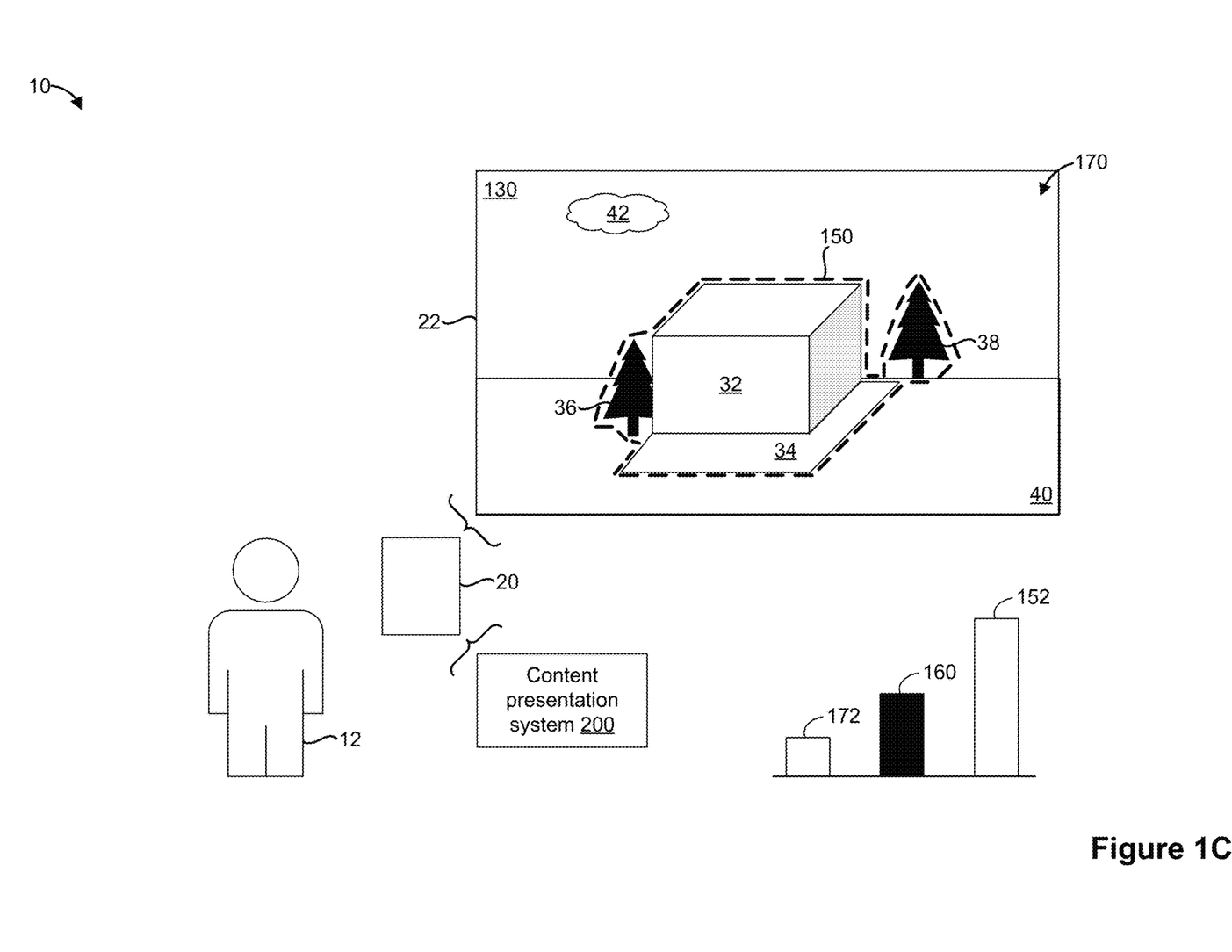

Referring to FIG. 1C, in various implementations, the content presentation system 200 renders a current frame 130 based on a type of content represented by the previously rendered frame 30 shown in FIGS. 1A and 1B. In the example of FIG. 1C, the content presentation system 200 renders a first portion 150 of the current frame 130 that corresponds to the first portion 50 of the previously rendered frame 30 (shown in FIG. 1B) with a first rendering characteristic 152. The first rendering characteristic 152 is greater than a threshold rendering characteristic 160. In some implementations, the first rendering characteristic 152 is a first resolution and the threshold rendering characteristic 160 is a threshold resolution. In some implementations, the first rendering characteristic 152 represents a first quality and the threshold rendering characteristic 160 represents a threshold quality. The first rendering characteristic 152 is a function of a first type of content that the first portion 50 of the previously rendered frame 30 represents. For example, when the first portion 50 of the previously rendered frame 30 represents high frequency content, the first rendering characteristic 152 represents a relatively high resolution.

The content presentation system 200 renders a second portion 170 of the current frame 130 that corresponds to the second portion 70 of the previously rendered frame 30 (shown in FIG. 1B) with a second rendering characteristic 172. The second rendering characteristic 172 is less than the threshold rendering characteristic 160. In some implementations, the second rendering characteristic 172 is a second resolution that is less than the first resolution of the first portion 150 of the current frame 130. In some implementations, the second rendering characteristic 172 is a second quality that is less than the first quality of the first portion 150. The second rendering characteristic 172 is a function of a second type of content that the second portion 70 of the previously rendered frame 30 represents. For example, when the second portion 70 of the previously rendered content 30 represents low frequency content, the second rendering characteristic 172 represents a relatively low resolution.

The first portion 150 of the current frame 130 includes visual elements that may require the first rendering characteristic 152 in order to avoid an adverse impact on viewability. For example, the building 32, the patio 34, the first tree 36 and the second tree 38 may need to be rendered at a sufficiently high resolution in order to deliver an acceptable user experience. By contrast, the second portion 170 of the current frame 130 may include visual elements that can be rendered at the second rendering characteristic 172 without having an adverse impact on viewability. For example, the grass 40 and the cloud 42 may be rendered at a relatively low resolution without adversely impacting the user experience. Rendering portions of the current frame 130 that are associated with low frequency content at a relatively low resolution tends to conserve computing resources while concurrently rendering portions of the current frame 130 that are associated with high frequency content at a relatively high resolution tends to provide an acceptable user experience. More generally, in various implementations, different portions of the current frame 130 are rendered at respective resolutions based on their corresponding types of content. For example, low frequency content can be rendered at a low resolution, medium frequency content can be rendered at a medium resolution and high frequency content can be rendered at a high resolution.

In some implementations, the content presentation system 200 utilizes techniques associated with variable rate shading (VRS) to generate the current frame 130. For example, the content presentation system 200 may obtain (e.g., generate or receive) a map with different zones that correspond to respective portions of the current frame 130. Each zone of the map can indicate a rendering characteristic for rendering a corresponding portion of the current frame 130. For example, a first zone of the map indicates that the first portion 150 of the current frame 130 is to be rendered with the first rendering characteristic 152, a second zone of the map indicates that the second portion 170 of the current frame 130 is to be rendered with the second rendering characteristic 172, a third zone of the map indicates that a third portion of the current frame 130 is to be rendered with a third rendering characteristic, . . . , and an nth zone of the map indicates that an nth portion of the current frame 130 is to be rendered with an nth rendering characteristic.

Figure 2:
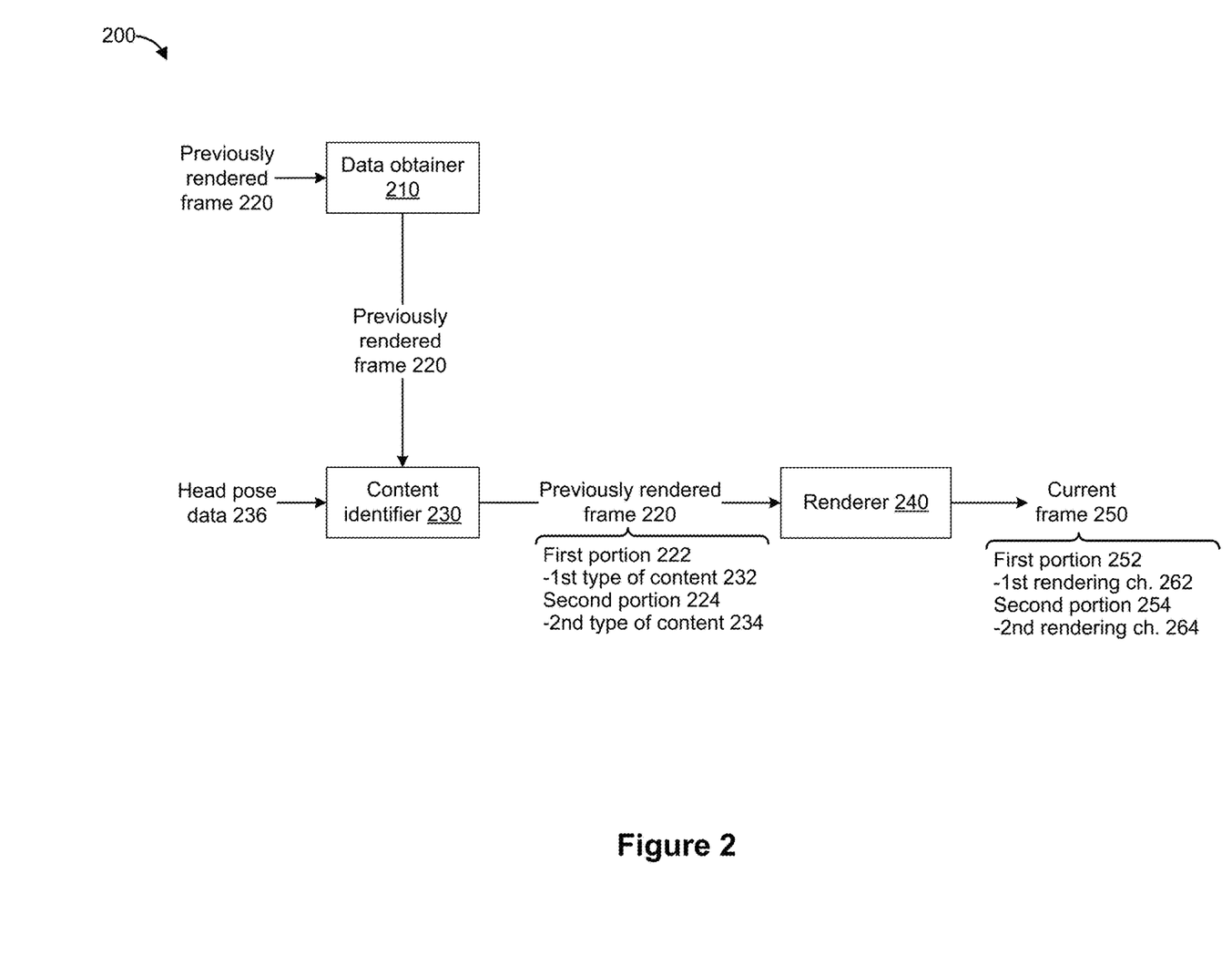
FIG. 2 is a diagram of a content presentation system in accordance with some implementations.

FIG. 2 is a block diagram of the content presentation system 200 in accordance with some implementations. In some implementations, the content presentation system 200 resides at the electronic device 20 shown in FIGS. 1A-IC. In various implementations, the content presentation system 200 includes a data obtainer 210, a content identifier 230 and a renderer 240.

In some implementations, the data obtainer 210 obtains a previously rendered frame 220 prior to the content presentation system 200 rendering a current frame 250. For example, the data obtainer 210 obtains the previously rendered frame 30 shown in FIGS. 1A and 1B. In some implementations, the renderer 240 rendered the previously rendered frame 220 at a previous time and the data obtainer 210 receives the previously rendered frame 220 from the renderer 240. In some implementations, the previously rendered frame 220 corresponds to a different time period than the current frame 250. For example, the previously rendered frame 220 corresponds to a previous time period and the current frame 250 corresponds to a current time period. Alternatively, in some implementations, the previously rendered frame 220 corresponds to the same time period as the current frame 250. For example, the previously rendered frame 220 may be a low resolution render (e.g., a low resolution version) of the current frame 250.

In various implementations, the content identifier 230 identifies types of content represented by respective portions of the previously rendered frame 220. In the example of FIG. 2, the content identifier 230 identifies that a first portion 222 of the previously rendered frame 220 represents a first type of content 232 and a second portion 224 of the previously rendered frame 220 represents a second type of content 234. In some implementations, the first type of content 232 is associated with a first set of frequencies that is greater than a threshold frequency (e.g., the first frequency 52 that is greater than the threshold frequency 60 shown in FIG. 1B). As such, in some implementations, the first type of content 232 is referred to as high frequency content. In some implementations, the second type of content 234 is associated with a second set of frequencies that is less than the threshold frequency (e.g., the second frequency 72 that is less than the threshold frequency 60 shown in FIG. 1B). As such, in some implementations, the second type of content 234 is referred to as low frequency content.

In some implementations, the content identifier 230 performs frequency analysis on the previously rendered frame 220 in order to determine frequencies associated with respective portions of the previously rendered frame 220. In some implementations, the content identifier 230 generates a discrete cosine transform (DCT) of the previously rendered frame 220. The DCT indicates frequencies of respective portions of the previously rendered frame 220. For example, the DCT indicates that the first portion 222 of the previously rendered frame 220 is associated with relatively high frequencies (e.g., the first frequency 52 that is greater than the threshold frequency 60 shown in FIG. 1B) and that the second portion 224 of the previously rendered frame 220 is associated with relatively low frequencies (e.g., the second frequency 72 that is less than the threshold frequency 60 shown in FIG. 1B).

In some implementations, the first type of content 232 refers to content with a first compression efficiency that is less than a threshold compression efficiency and the second type of content 234 refers to content with a second compression efficiency that is greater than the threshold compression efficiency. The first type of content 232 may be less compressible than the second type of content 234, for example, because the first type of content 232 may be associated with more texture values than the second type of content 232. In some implementations, the content identifier 230 performs compression analysis on the previously rendered frame 220 in order to determine compression efficiencies of respective portions of the previously rendered frame 220. For example, the content identifier 230 compresses the previously rendered frame 220 and determines that the first portion 222 represents the first type of content 232 (e.g., content with a great number of texture values) due to a relatively low compression efficiency and the second portion 224 represents the second type of content 234 (e.g., content with fewer texture values) due to a relatively high compression efficiency.

In some implementations, the content identifier 230 performs a reprojection operation on the previously rendered frame 220 prior to identifying the types of content associated with the respective portions of the previously rendered frame 220. In some implementations, the content identifier 230 obtains head pose data 236 that indicates a movement of a head of the user 12 (shown in FIGS. 1A-1C) since previous head pose data was obtained. Reprojecting the previously rendered frame 220 increases a likelihood that the previously rendered frame 220 will be similar to the current frame 250. Increasing a similarity between the previously rendered frame 220 and the current frame 250 tends to improve an estimation of which portions of the current frame 250 are likely to correspond to high frequency content.

In some implementations, the content identifier 230 indicates a location and/or a size of the first portion 222 of the previously rendered frame 220 to the renderer 240. The renderer 240 renders a first portion 252 of the current frame 250 that corresponds to the first portion 222 of the previously rendered frame 220 with a first rendering characteristic 262 (e.g., the first rendering characteristic 152 shown in FIG. 1C). The first rendering characteristic 262 is a function of the first type of content 232. In some implementations, the first rendering characteristic 262 is a first quality metric that is based on the first type of content 232. In some implementations, the first rendering characteristic 262 is a first resolution and the first type of content 232 refers to a first frequency of the first portion 222 of the previously rendered frame 220. For example, the first rendering characteristic 262 is a relatively high resolution when the first type of content 232 is high frequency content (e.g., content with a frequency that is greater than the threshold frequency 60 shown in FIG. 1B).

In some implementations, the content identifier 230 indicates a location and/or a size of the second portion 224 of the previously rendered frame 220 to the renderer 240. The renderer 240 renders a second portion 254 of the current frame 250 that corresponds to the second portion 224 of the previously rendered frame 220 with a second rendering characteristic 264 (e.g., the second rendering characteristic 172 shown in FIG. 1C). The second rendering characteristic 264 is different from (e.g., smaller than or greater than) the first rendering characteristic 262. The second rendering characteristic 264 is a function of the second type of content 234. In some implementations, the second rendering characteristic 264 is a second quality metric that is based on the second type of content 234. In some implementations, the second rendering characteristic 264 is a second resolution and the second type of content 234 refers to a second frequency of the second portion 224 of the previously rendered frame 220. For example, the second rendering characteristic 264 is a relatively low resolution when the second type of content 234 is low frequency content (e.g., content with a frequency that is less than the threshold frequency 60 shown in FIG. 1B).

In some implementations, the second portion 254 of the current frame 250 corresponds to a portion of the current frame 250 that is not encompassed by the first portion 252 of the current frame 250. For example, the renderer 240 renders the first portion 252 of the current frame 250 with the first rendering characteristic 262 and the renderer 240 renders a remainder of the current frame 250 with the second rendering characteristic 264. In some implementations, the second portion 254 of the current frame 250 refers to portions of the current frame 250 that are expected to represent low frequency content.

In various implementations, the renderer 240 utilizes sparse rendering to the render the current frame 250. In some implementations, the renderer 240 includes multiple renderers for rendering different portions of the current frame 250 associated with respective rendering characteristics. For example, the renderer 240 includes a first renderer that renders the first portion 252 of the current frame 250 with the first rendering characteristic 262 and a second renderer that renders the second portion 254 of the current frame 250 with the second rendering characteristic 264.

In some implementations, the renderer 240 utilizes different shaders for rendering different portions of the current frame 250. In some implementations, the renderer 240 utilizes shaders of varying complexity to render the different portions of the current frame 250. In some implementations, the complexity of the shader that the renderer 240 utilizes to render a particular portion of the current frame 250 is based on the rendering characteristic with which that particular portion of the current frame 250 is to be rendered. For example, the renderer 240 utilizes a first shader with a first level of complexity (e.g., a relatively high complexity) to render the first portion 252 of the current frame 250 and a second shader with a second level of complexity (e.g., relatively low complexity) to render the second portion 254 of the current frame 250. In some implementations, a complexity level of the shader that the renderer 240 utilizes to render a portion of the current frame 250 is proportional to a value of the rendering characteristic with which that portion of the current frame 250 is to be rendered.

In some implementations, the renderer 240 utilizes a tree data structure to represent different portions of the current frame 250. In some implementations, the renderer 240 utilizes a quad-tree representation to represent the different portions of the current frame 250. For example, each quadrant in the quad-tree representation may correspond to a particular portion of the current frame 250. In some implementations, the quadrant that a particular portion of the current frame 250 is mapped to is based on a corresponding rendering characteristic of that particular portion of the current frame 250.

In some implementations, rendering the second portion 254 of the current frame 250 with the second rendering characteristic 264 requires fewer computing resources than rendering the first portion 252 of the current frame 250 with the first rendering characteristic 262. Since the first portion 252 of the current frame 250 corresponds to the first portion 222 of the previously rendered frame 220 and the second portion 254 of the current frame 250 corresponds to the second portion 224 of the previously rendered frame 220, identifying the first portion 222 and the second portion 224 of the previously rendered frame 220 allows the renderer 240 to conserve resources by rendering the second portion 254 with the second rendering characteristic 264 and deliver an acceptable user experience by rendering the first portion 252 with the first rendering characteristic 262.

Figure 3:
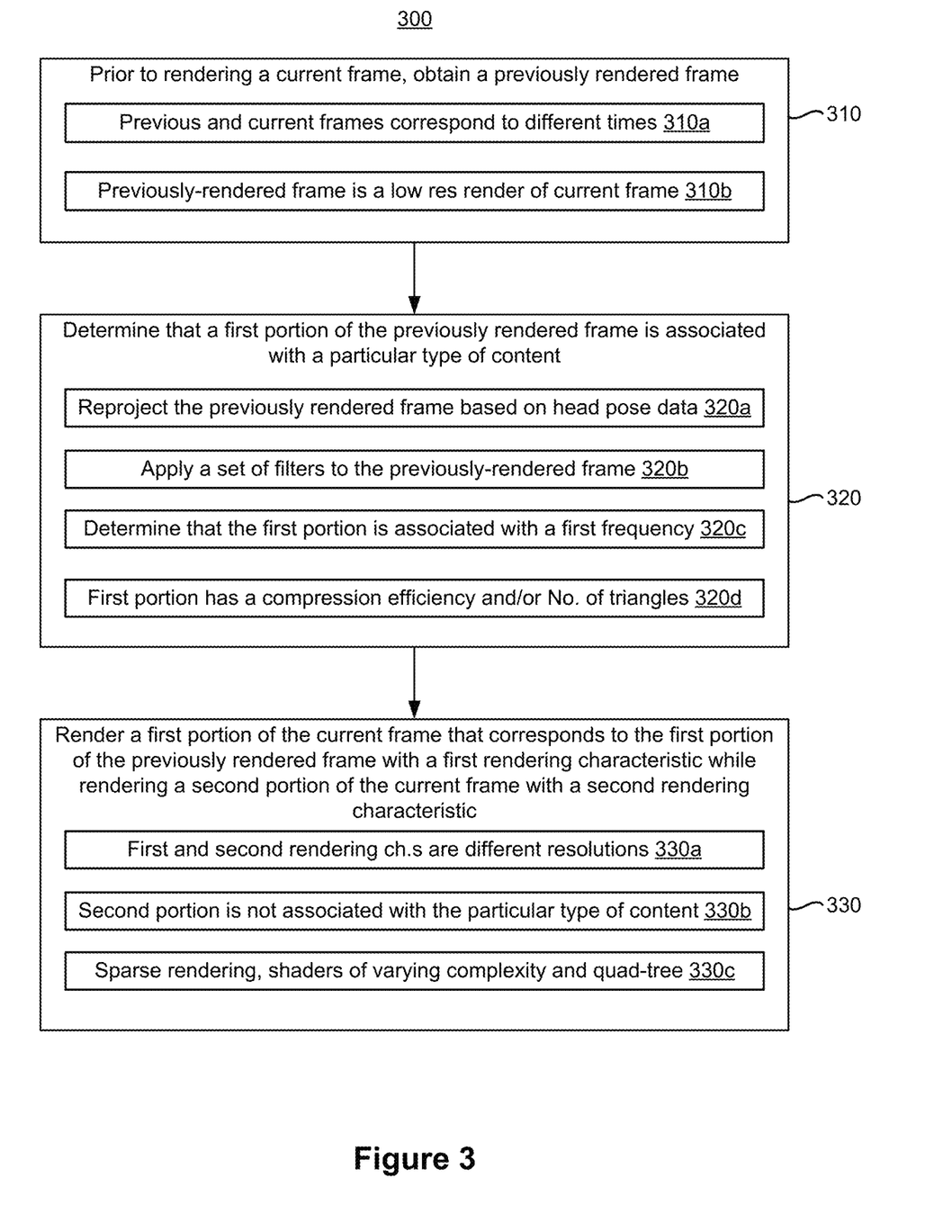
FIG. 3 is a flowchart representation of a method of foveating a frame based on content in accordance with some implementations.

FIG. 3 is a flowchart representation of a method 300 for foveating a frame based on content. In some implementations, the method 300 is performed by a device including a display, a non-transitory memory and one or more processors coupled with the display and the non-transitory memory. In various implementations, the method 300 is performed by the electronic device 20 shown in FIGS. 1A-1C and/or the content presentation system 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes, prior to rendering a current frame, obtaining a previously rendered frame. For example, as shown in FIGS. 1A-IC, the electronic device 20 obtains the previously rendered frame 30 prior to rendering the current frame 130. As another example, as shown in FIG. 2, the content presentation system 200 obtains the previously rendered frame 220 prior to rendering the current frame 250. In some implementations, the method 300 includes receiving the previously rendered frame from a renderer that rendered the previously rendered frame at a previous time. In some implementations, the method 300 includes retrieving the previously rendered frame from a memory location.

As represented by block 310a, in some implementations, the current frame corresponds to a first time and the previously rendered frame corresponds to a second time that occurred prior to the first time. For example, the current frame corresponds to a current time and the previously rendered frame corresponds to a previous time. In some implementations, a time difference between the first time corresponding to the current frame and the second time corresponding to the previously rendered frame is less than a threshold. Limiting the time difference between the first time and the second time tends to reduce a difference in content of the previously rendered frame and the current frame. Limiting the difference in content of the previously rendered frame and the current frame allows the device to use the previously rendered frame to predict which portions of the current frame are to be rendered at a relatively high resolution and which portions of the current frame can be rendered at a relatively low resolution.

As represented by block 310b, in some implementations, the previously rendered frame is a low resolution render of the current frame. For example, the previously rendered frame 30 shown in FIGS. 1A and 1B may be a low resolution version of the current frame 130 shown in FIG. 1C. As another example, the previously rendered frame 220 shown in FIG. 2 may be a low resolution version of the current frame 250. In some implementations, the device renders a low resolution version of the current frame. The device analyzes the low resolution version of the current frame to identify portions that represent high frequency content. After identifying portions that represent high frequency content, the device can render the portions representing high frequency content at a high resolution and render a remainder of the current frame at a low resolution. Rendering the low resolution version of the current frame is less resource intensive than rendering an entirety of the current frame at a high resolution.

As represented by block 320, in various implementations, the method 300 includes determining that a first portion of the previously rendered frame is associated with a particular type of content. For example, as shown in FIG. 2, the content identifier 230 determines that the first portion 222 of the previously rendered frame 220 represents the first type of content. In some implementations, the method 300 includes identifying various portions (e.g., all portions) of the previously rendered frame that represent the particular type of content. In some implementations, the method 300 includes performing image analysis on the previously rendered frame to determine the types of content represented by respective portions of the previously rendered frame. In some implementations, the method 300 includes performing frequency analysis on the previously rendered frame to determine frequencies associated with respective portions of the previously rendered frame.

As represented by block 320a, in some implementations, the method 300 includes, prior to determining that the first portion of the previously rendered frame is associated with the particular type of content, reprojecting the previously rendered frame based on head pose data that indicates a head pose of a user of the device. For example, as shown in FIG. 2, the content identifier 230 reprojects the previously rendered frame 220 based on the head pose data 236. Reprojecting the previously rendered frame 220 may include warping the previously rendered frame 220 based on a head movement indicated by the head pose data 236. Reprojecting the previously rendered frame tends to reduce a difference between the previously rendered frame and the current frame that is to be rendered thereby making the content represented by the previously rendered frame an acceptable approximation of the content that the current frame will likely represent.

As represented by block 320b, in some implementations, the method 300 includes, prior to determining that the first portion of the previously rendered frame is associated with the particular type of content, applying a set of one or more filters to the previously rendered frame. For example, referring to FIG. 2, the content identifier 230 may apply a set of one or more filters to the previously rendered frame 220 prior to determining that the first portion 222 of the previously rendered frame 220 represents the first type of content 232 and the second portion 224 of the previously rendered frame 220 represents the second type of content 234. In some implementations, applying the filter(s) to the previously rendered frame tends to reduce a difference between the previously rendered frame and the current frame that is to be rendered thereby making the content of the previously rendered frame an acceptable prediction of the content of the current frame.

As represented by block 320c, in some implementations, determining that the first portion of the previously rendered frame is associated with the particular type of content includes determining that the first portion of the previously rendered frame is associated with a first frequency that is greater than a threshold frequency. For example, as shown in FIG. 1B, the content presentation system 200 determines that the first portion 50 of the previously rendered frame 30 represents content that is associated with the first frequency 52 that is greater than the threshold frequency 60. In some implementations, the method 300 includes determining that a second portion of the previously rendered frame is associated with a second frequency that is less than the threshold frequency. For example, as shown in FIG. 1B, the content presentation system 200 determines that the second portion 70 of the previously rendered frame 30 represents content that is associated with the second frequency 72 that is less than the threshold frequency 60. In some implementations, the device determines that the first portion of the previously rendered frame represents high frequency content and the second portion of the previously rendered frame represents low frequency content.

In some implementations, the method 300 includes performing a discrete cosine transform (DCT) on the previously rendered frame to determine that the first portion of the previously rendered frame is associated with the first frequency and the second portion of the previously rendered frame is associated with the second frequency. In some implementations, the DCT of the previously rendered frame indicates that the first portion of the previously rendered frame is associated with a first range of frequencies that is greater than a threshold frequency and the second portion of the previously rendered frame is associated with a second range of frequencies that is less than the threshold frequency. In some implementations, the DCT of the previously rendered frame indicates that the first portion of the previously rendered frame represents high frequency content and the second portion of the previously rendered frame represents low frequency content.

As represented by block 320d, in some implementations, determining that the first portion of the previously rendered frame is associated with the particular type of content includes determining that a compression efficiency of the first portion is less than a compression efficiency threshold. In some implementations, the method 300 includes compressing the previously rendered frame and determining compression efficiencies of respective portions of the previously rendered frame. Portions of the previously rendered frame that can be compressed at a relatively high compression efficiency are likely associated with a relatively small number of texture values and therefore corresponding portions of the current frame can be displayed at a relatively low resolution thereby conserving rendering resources. By contrast, portions of the previously rendered frame that are compressed at a relatively low compression efficiency are likely associated with a relatively large number of texture values and therefore corresponding portions of the current frame need to be displayed at a relatively high resolution in order to provide an acceptable level of user experience.

In some implementations, determining that the first portion of the previously rendered frame is associated with the particular type of content includes determining that a number of triangles rendered in association with the first portion is greater than a threshold number of triangles. In some implementations, the method 300 includes determining numbers of polygons rendered in association with (e.g., within) respective portions of the previously rendered frame. For example, the device determines numbers of triangles rendered within respective portions of the previously rendered frame. Portions of the previously rendered frame that include a relatively large number of triangles likely correspond to portions of the current frame that are to be rendered at a relatively high resolution in order to deliver an acceptable level of user experience. By contrast, portions of the previously rendered frame that include a relatively small number of triangles likely correspond to portions of the current frame that can be rendered at a relatively low resolution to conserve rendering resources without sacrificing the user experience.

As represented by block 330, in various implementations, the method 300 includes rendering a first portion of the current frame that corresponds to the first portion of the previously rendered frame with a first rendering characteristic while rendering a second portion of the current frame with a second rendering characteristic that is different from the first rendering characteristic. For example, as shown in FIG. 1C, the content presentation system 200 renders the first portion 150 of the current frame 130 with the first rendering characteristic 152 that is greater than the threshold rendering characteristic 160 and the content presentation system 200 renders the second portion 170 of the current frame 130 with the second rendering characteristic 172 that is less than the threshold rendering characteristic 160. Rendering the first portion of the current frame with the first rendering characteristic allows the device to display the first portion of the current frame with a target viewability (e.g., with an acceptable level of user experience). Not rendering the second portion of the current frame with the first rendering characteristic allows the device to conserve rendering resources since rendering content with the second rendering characteristic requires fewer rendering resources than rendering content with the first rendering characteristic.

As represented by block 330a, in some implementations, the first rendering characteristic corresponds to a first resolution and the second rendering characteristic corresponds to a second resolution that is less than the first resolution. For example, as discussed in relation with FIG. 1C, the first rendering characteristic 152 at which the first portion 150 of the current frame 130 is rendered may refer to a first resolution that is greater than a threshold resolution represented by the threshold rendering characteristic 160 and the second rendering characteristic 172 at which the second portion 170 of the current frame 130 is rendered may refer to a second resolution that is less than the threshold resolution represented by the threshold rendering characteristic 160. Rendering content at the first resolution may be more resource-intensive than rendering content at the second resolution. As such, not rendering the second portion of the current frame at the first resolution tends to conserve rendering resources.

In some implementations, the first rendering characteristic corresponds to a first quality and the second rendering characteristic corresponds to a second quality that is less than the first quality. For example, referring to FIG. 2, rendering the first portion 252 of the current frame 250 with the first rendering characteristic 262 may refer to rendering the first portion 252 of the current frame 250 at a first quality and rendering the second portion 254 of the current frame 250 with the second rendering characteristic 264 may refer to rendering the second portion 254 of the current frame 250 at a second quality that is lower than the first quality. Rendering content with the first quality may require more rendering resources than rendering content with the second quality. As such, rendering the second portion of the current frame at the second quality tends to conserve rendering resources.

As represented by block 330b, in some implementations, the second portion of the current frame corresponds to a second portion of the previously rendered frame that is not associated with the particular type of content. For example, as shown in FIGS. 1B and 1C, the second portion 170 of the current frame 130 corresponds to the second portion 70 of the previously rendered frame 30 that is associated with the second frequency 72 that is less than the threshold frequency 60. In some implementations, the method 300 includes estimating, based on the first portion of the previously rendered frame, that the first portion of the current frame represents high frequency content that needs to be rendered at a first resolution. In some implementations, the method 300 includes estimating, based on the second portion of the previously rendered frame, that the second portion of the current frame represents low frequency content that can be rendered at a second resolution that is lower than the first resolution.

As represented by block 330c, in various implementations, the method 300 includes utilizing sparse rendering to render different portions of the current frame with respective rendering characteristics. In some implementations, the first portion is rendered by a first renderer that renders content at a first resolution and the second portion is rendered by a second renderer that renders content at a second resolution that is less than the first resolution. For example, referring to FIG. 2, the renderer 240 may include a high resolution renderer that renders the first portion 252 of the current frame 250 at a relatively high resolution and a low resolution renderer that renders the second portion 254 of the current frame 250 at a relatively low resolution.

In some implementations, rendering the first portion includes utilizing a first shader that is associated with a first level of complexity and rendering the second portion includes utilizing a second shader that is associated with a second level of complexity that is lower than the first level of complexity. In some implementations, rendering the first portion at a relatively high resolution includes utilizing a shader of a relatively high complexity, and rendering the second portion at a relatively low resolution includes utilizing a shader of a relatively low complexity. In some implementations, the complexity of the shader is a function of the rendering characteristic. For example, rendering content at relatively high resolutions utilizes greater complexity shaders and rendering content at relatively low resolutions utilizes lower complexity shaders.

In some implementations, the method 300 includes utilizing a quad-tree data structure to represent the first portion of the current frame and the second portion of the current frame. In some implementations, each quadrant of the quad-tree data structure represents a portion of the current frame that is to be rendered with a particular rendering characteristic. In some implementations, the quad-tree data structure represents a hierarchy of portions of the current frame, and portions of the current frame at a higher tier of the hierarchy are to be rendered with a greater rendering characteristic that portions of the current frame at a lower tier of the hierarchy.

Figure 4:
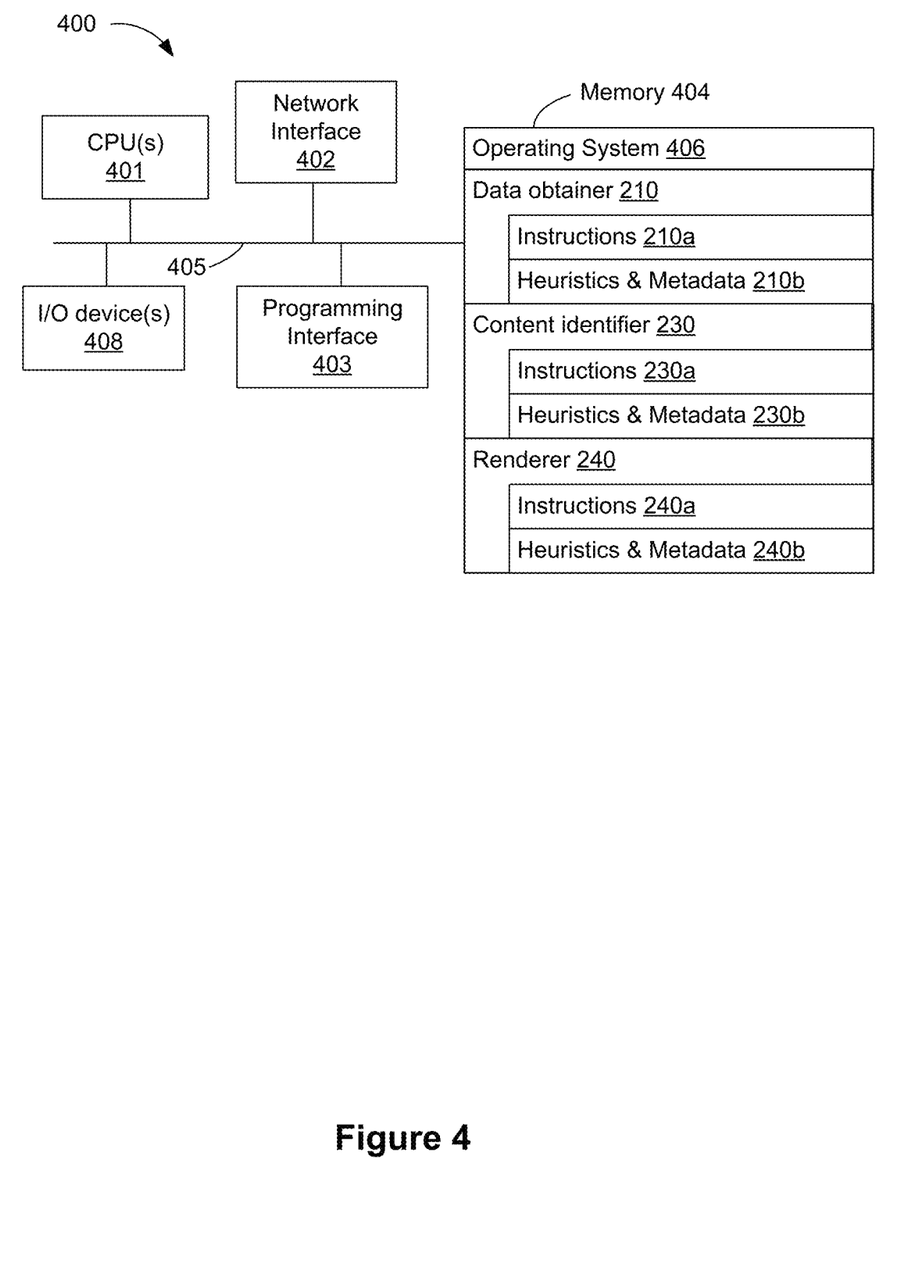
FIG. 4 is a block diagram of a device that foveates a frame based on content in accordance with some implementations.

FIG. 4 is a block diagram of a device 400 in accordance with some implementations. In some implementations, the device 400 implements the electronic device 20 shown in FIGS. 1A-1C and/or the content presentation system 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display (e.g., the display 22 shown in FIGS. 1A-1C). In some implementations, the display includes an extended reality (XR) display. In some implementations, the display includes an opaque display. Alternatively, in some implementations, the display includes an optical see-through display. In some implementations, the one or more I/O devices 408 include an image sensor.

In some implementations, the memory 404 or the non-transitory computer readable storage medium of the memory 404 stores the following programs, modules and data structures, or a subset thereof including an optional operating system 406, the data obtainer 210, the content identifier 230 and the renderer 240.

In various implementations, the data obtainer 210 includes instructions 210a, and heuristics and metadata 210b for obtaining a previously rendered frame prior to rendering a current frame (e.g., the previously rendered frame 30 shown in FIGS. 1A and 1B, and/or the previously rendered frame 220 shown in FIG. 2).

In some implementations, the content identifier 230 includes instructions 230a, and heuristics and metadata 230b for determining that a first portion of the previously rendered frame is associated with a particular type of content (e.g., for determining that the first portion 50 of the previously rendered frame 30 represents content that is associated with the first frequency 52 that is greater than the threshold frequency 60 shown in FIG. 1B).

In some implementations, the renderer 240 includes instructions 240a, and heuristics and metadata 240b for rendering a first portion of the current frame that corresponds to the first portion of the previously rendered frame with a first rendering characteristic while rendering a second portion of the current frame with a second rendering characteristic that is different from the first rendering characteristic (e.g., for rendering the first portion 150 of the current frame 130 with the first rendering characteristic 152 that is greater than the threshold rendering characteristic 160 and rendering the second portion 170 of the current frame 130 with the second rendering characteristic 172 that is less than the threshold rendering characteristic 160).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   at a device including a display, a non-transitory memory and one or more processors coupled with the display and the non-transitory memory:
   prior to rendering a current frame, obtaining a previously rendered frame;
   reprojecting the previously rendered frame based on head pose data that indicates a head pose of a user of the device;
   determining that a first portion of the previously rendered frame is associated with a particular type of content based on the reprojected frame; and
   rendering a first portion of the current frame that corresponds to the first portion of the previously rendered frame with a first rendering characteristic while rendering a second portion of the current frame with a second rendering characteristic that is different from the first rendering characteristic.

2. The method of claim 1, wherein the current frame corresponds to a first time and the previously rendered frame corresponds to a second time that occurred prior to the first time.

3. The method of claim 1, wherein the previously rendered frame is a low resolution render of the current frame.

4. The method of claim 1, wherein the reprojecting the previously rendered frame based on head pose data is prior to determining that the first portion of the previously rendered frame is associated with the particular type of content.

5. The method of claim 1, further comprising:
   prior to determining that the first portion of the previously rendered frame is associated with the particular type of content, applying a set of one or more filters to the previously rendered frame.

6. The method of claim 1, wherein determining that the first portion of the previously rendered frame is associated with the particular type of content comprises determining that the first portion of the previously rendered frame is associated with a first frequency that is greater than a threshold frequency.

7. The method of claim 6, further comprising determining that a second portion of the previously rendered frame is associated with a second frequency that is less than the threshold frequency.

8. The method of claim 7, further comprising generating a discrete cosine transform (DCT) for the previously rendered frame to determine that the first portion of the previously rendered frame is associated with the first frequency and the second portion of the previously rendered frame is associated with the second frequency.

9. The method of claim 1, wherein determining that the first portion of the previously rendered frame is associated with the particular type of content comprises determining that a compression efficiency of the first portion is less than a compression efficiency threshold.

10. The method of claim 1, wherein determining that the first portion of the previously rendered frame is associated with the particular type of content comprises determining that a number of triangles rendered in association with the first portion is greater than a threshold number of triangles.

11. The method of claim 1, wherein the first rendering characteristic corresponds to a first resolution and the second rendering characteristic corresponds to a second resolution that is less than the first resolution.

12. The method of claim 1, wherein the first rendering characteristic corresponds to a first quality and the second rendering characteristic corresponds to a second quality that is less than the first quality.

13. The method of claim 1, wherein the second portion of the current frame corresponds to a second portion of the previously rendered frame that is not associated with the particular type of content.

14. The method of claim 1, wherein the first portion of the current frame is rendered by a first renderer that renders content at a first resolution and the second portion of the current frame is rendered by a second renderer that renders content at a second resolution that is less than the first resolution.

15. The method of claim 1, wherein rendering the first portion of the current frame comprises utilizing a first shader that is associated with a first level of complexity and rendering the second portion of the current frame comprises utilizing a second shader that is associated with a second level of complexity that is lower than the first level of complexity.

16. The method of claim 1, further comprising utilizing a quad-tree data structure to represent the first portion of the current frame and the second portion of the current frame.

17. A device comprising:
   a display;
   one or more processors;
   a non-transitory memory; and
   one or more programs stored in the non-transitory memory, which, when executed by the one or more processors, cause the device to:
   prior to rendering a current frame, obtain a previously rendered frame;
   reproject the previously rendered frame based on head pose data that indicates a head pose of a user of the device;
   determine that a first portion of the previously rendered frame is associated with a particular type of content based on the reprojected frame; and
   render a first portion of the current frame that corresponds to the first portion of the previously rendered frame with a first rendering characteristic while rendering a second portion of the current frame with a second rendering characteristic that is different from the first rendering characteristic.

18. The device of claim 17, wherein the current frame corresponds to a first time and the previously rendered frame corresponds to a second time that occurred prior to the first time.

19. A non-transitory memory storing one or more programs, which, when executed by one or more processors of a device with a display, cause the device to:
  prior to rendering a current frame, obtain a previously rendered frame;
  reproject the previously rendered frame based on head pose data that indicates a head pose of a user of the device;
  determine that a first portion of the previously rendered frame is associated with a particular type of content based on the reprojected frame; and
  render a first portion of the current frame that corresponds to the first portion of the previously rendered frame with a first rendering characteristic while rendering a second portion of the current frame with a second rendering characteristic that is different from the first rendering characteristic.

20. The non-transitory memory of claim 19, wherein the previously rendered frame is a low resolution render of the current frame.

* * * * *